Oct. 7, 1947.  R. E. MARBURY  2,428,576
SERIES CAPACITOR
Filed Jan. 14, 1944
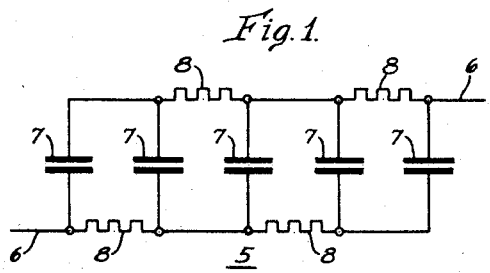
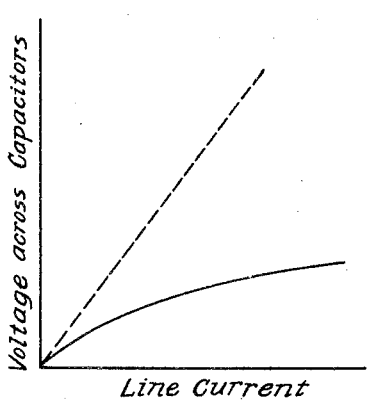
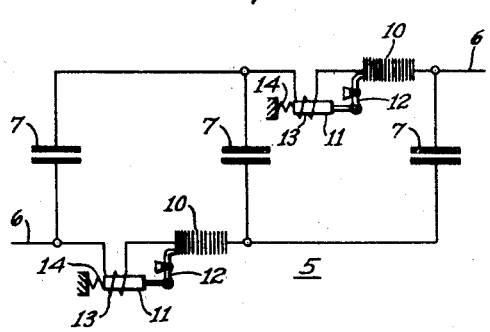
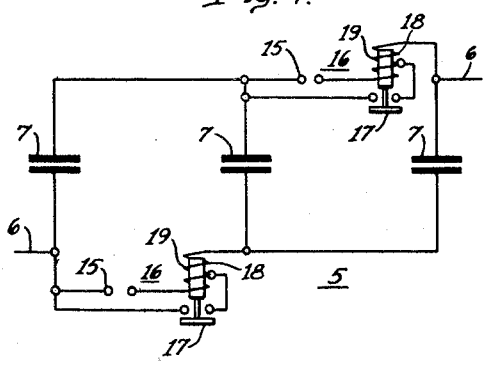
WITNESSES:
INVENTOR
Ralph E. Marbury.
BY
ATTORNEY Patented Oct. 7, 1947

2,428,576

UNITED STATES PATENT OFFICE 2,428,576

SERIES CAPACITOR

Ralph E. Marbury, Wilkinsburg, Pa., assignor to Westinghouse Electric Corporation, East Pittsburgh, Pa., a corporation of Pennsylvania Application January 14, 1944, Serial No. 518,209

11 Claims. (Cl. 172—237)

The present invention relates to series capacitors for alternating-current transmission or distribution lines and, more particularly, to a series capacitor assembly in which the capacitors are protected against damage from overvoltage.

Series capacitors are used in alternating-current transmission and distribution lines to neutralize part or all of the inductive reactance of the line, in order to increase the power limits and improve the stability of high-voltage synchronous transmission systems, and to improve the voltage regulation of distribution lines. Since such capacitors are connected in series in the line and carry the line current, the voltage across the capacitor is proportional to the line current. In case of a fault on the line, the current may increase to several times its normal value and the voltage across the series capacitor rises correspondingly. The cost of a capacitor varies approximately as the square of the voltage for which it is insulated, and for this reason it is economically impractical to design series capacitors on the basis of the maximum voltage which they might have to withstand under fault conditions. The voltage rating of series capacitors is, therefore, usually determined by the voltage corresponding to the normal full-load current, and protective means are provided for protecting the capacitors against excess voltages.

The protective devices which have been used for protecting series capacitors against overvoltages have utilized some means for by-passing the capacitor in response to the occurrence of a voltage across the capacitor greater than a predetermined maximum safe value, usually by means of a spark gap, or other type of discharge device, in order to obtain substantially instantaneous response, and usually with additional means for by-passing both the gap and the capacitor, and for interrupting the by-pass circuit to restore the capacitor to service when the current has fallen to a safe value.

The purpose of the present invention is to provide a series capacitor assembly utilizing an entirely different and novel method for protecting the capacitors which make up a series capacitor bank against overvoltage. This result is accomplished in accordance with the present invention by providing means responsive to the voltage across the capacitors for reducing the reactance of the series capacitor bank, in response to excess voltage, so that the voltage across it, which is a function of the line current and the capacitor bank reactance, is correspondingly reduced and limited to a safe value.

A further object of the invention is to provide a series capacitor assembly which comprises a capacitor bank made up of a plurality of normally series-connected capacitors with voltage-responsive means for, in effect, changing the connection of the capacitors from series to parallel upon the occurrence of an excess voltage, so as to reduce the reactance of the capacitor bank and, therefore, the voltage across the individual capacitors.

A more specific object of the invention is to provide a series capacitor assembly comprising a capacitor bank in which the capacitors are connected in series under normal voltage conditions, and in which variable resistance means, or discharge devices, are connected across successive pairs of capacitors in such a manner that they effect connections for paralleling the capacitors when the voltage across the capacitors exceeds a predetermined value, so as to reduce the reactance of the capacitor bank.

Other objects and advantages of the invention will be apparent from the following detailed description, taken in connection with the accompanying drawing, in which:

Figure 1 is a schematic diagram showing one embodiment of the invention,

Fig. 2 is a diagram illustrating the relation of current and voltage in the circuit of Fig. 1, and Figs. 3 and 4 are schematic diagrams showing further embodiments of the invention.

Fig. 1 shows a series capacitor assembly connected in series in an alternating-current line 6, which represents one conductor of either a single-phase or three-phase alternating-current transmission or distribution line in which it is desired to introduce series capacitance. The series capacitor comprises a capacitor bank 5 consisting of a suitable number of individual capacitors 7. It is to be understood that each of the capacitors 7 may be either a single capacitor unit or a plurality of individual capacitor units connected together in any suitable series or parallel connection to obtain the desired capacitance and voltage rating. The capacitors 7 are connected together as shown, with non-linear resistors 8 connected across successive pairs of capacitors in such a manner as to effect a parallel connection of the capacitors 7. It will be observed, however, that if the resistance of the resistors 8 is very high, or if they are substantially non-conducting, the capacitors 7 are, in effect, connected together in series.

The resistors 8 are of the type commonly referred to as non-linear, such as are used as valve elements in lightning arresters, and may, for example, consist of granular silicon carbide mixed with a suitable binder, such as sodium silicate, and molded into blocks of suitable size and shape and baked. Such resistors are well known, and have the characteristic that when subjected to a voltage below a certain more or less critical value, their resistance is so high that they may be considered substantially non-conducting, while when the applied voltage exceeds this value, the resistance drops rapidly so that they become relatively good conductors.

The non-linear resistors 8 of Fig. 1 are designed so that when normal full-load current is flowing in the line 6, the voltage across each pair of capacitors 7, which is applied to a resistor 8, is below the critical voltage of the resistor so that it is substantially a non-conductor. It will be apparent, therefore, that the capacitors 7 will in effect be connected in series under normal conditions, and the voltage drop across the capacitor bank 5 will be determined by the line current and the reactance of the bank, which will be equal to the sum of the reactances of the capacitors 7 or, in the example shown, five times the reactance of a single capacitor.

In case of a fault on the line 6, the current will rapidly increase to a value which may be several times its normal value. The voltage across the capacitors 7 and, therefore, the voltage applied to each of the resistors 8, will increase correspondingly, which results in a rapid decrease in the resistance of the resistors 8, so that they change from a substantially non-conducting condition to a relatively highly conducting condition, thus limiting the voltage that can appear across the capacitors 7. It will be obvious that the effect of this is to change the connection of the capacitors 7 within the bank 5 from series to parallel, so that the resultant reactance of the capacitor bank, in the example shown, will change from five times the reactance of a single capacitor to approximately one-fifth of the reactance of a single capacitor or, in this particular case, a decrease in reactance to one twenty-fifth of its previous value. The voltage across the capacitor bank will, therefore, be decreased in the same proportion. Since the capacitors are now in parallel rather than in series, however, the voltage drop across each capacitor will be equal to the voltage drop across the bank and will, therefore, be one-fifth of the voltage that would have appeared across each capacitor if they had remained in the series connection.

These ratios, of course, are for a capacitor bank consisting of five capacitors, as shown in Fig. 1, and are merely illustrative, since any suitable number of capacitors may be used, and the decrease in reactance of the capacitor bank 5 will be approximately proportional to the square of the number of capacitors. This relation is based on the assumption that the resistance of the non-linear resistors 8 changes from infinity to zero when the voltage rises which, of course, is not entirely correct, since the resistors actually have some very slight conductivity under normal conditions, and have some resistance under excess voltage conditions, so that the actual change in reactance of the capacitor bank will be less than indicated above, although it will approach the ratio stated.

In an actual case, the relation of line current to voltage across the capacitor bank 5 will be approximately as shown in Fig. 2. If the resistors 8 were not used, and the capacitors 7 remained in series at all times, the voltage across the capacitor bank 5 would be directly proportional to the line current, as shown by the dotted line in Fig. 2. With the non-linear resistors 8, however, the reactance of the capacitor bank 5 will decrease rapidly with increasing current, and the actual rise in voltage across the capacitor bank as the current increases will be approximately as shown by the solid curve in Fig. 2, so that the voltage across the capacitors remains within safe limits even when very heavy fault currents occur in the line. Thus, the effect of the non-linear resistors 8 is to limit the voltage which can appear across the capacitors 7 to a safe value, which is very much less than the voltage that would appear across them under fault conditions if the resistors were omitted. In this way, a series capacitor assembly is provided in which the capacitors are reliably protected against being subjected to dangerous overvoltages, but which does not require the use of the spark gaps and contactors or circuit breakers which have been necessary in the protective devices used in the prior art.

It will be apparent that other types of voltage-responsive variable resistance means might be used in place of the non-linear resistors 8. Thus, in Fig. 3 the resistors 8 are replaced by variable resistance devices 10, which are shown as being carbon pile or compression rheostats, consisting of a stack of disks of carbon or other suitable material having a resistance which varies with the pressure on the stack. Only three capacitors 7 are shown in Fig. 3, but it will be understood that any number of capacitors may be used, and that the variable resistors 10 are to be connected in the same manner as the non-linear resistors 8 of Fig. 1. In this embodiment of the invention, voltage-responsive means are provided for varying the resistance of the resistors 10, consisting, for example, of a movable armature 11 adapted to vary the pressure on the resistor 10 by any suitable means, generally indicated at 12, and controlled by a solenoid 13 which is connected in series with the resistor 10 so as to be responsive to the voltage across the two capacitors 7 across which the coil 13 and resistor 10 are connected. Under normal conditions, the armature 11 is held by any suitable means, such as a spring 14, in the position where minimum pressure is exerted on the stack of disks 10 so that it has its maximum resistance and preferably may be substantially non-conducting. When the voltage increases in response to an increase in line current sufficient current flows to the solenoid 13 to cause it to move the armature 11 to increase the pressure on the resistor 10 and thus decrease its resistance so that, in effect, the connection of the capacitors 7 is changed from series to parallel in the same manner as in Fig. 1. It will be obvious that the operation of the embodiment of the invention shown in Fig. 3 is the same as that of Fig. 1, since it differs only in the use of a different type of voltage-responsive variable resistance means.

Both of the embodiments of the invention shown in Figs. 1 and 3, therefore, provide a relatively simple and reliable means for preventing the occurrence of excess voltage across the capacitors of a series capacitor bank. This arrangement has numerous advantages resulting from its simplicity and low cost as compared to the protective devices which have previously been used, since it eliminates the necessity for spark gaps and contactors or circuit breakers with the necessary associated equipment. In the embodiment of Fig. 1, no moving parts of any kind are required, which is also an important advantage in equipment of this type which is normally called upon to operate only at long intervals.

Another advantage of this arrangement is that when the voltage across the capacitors increases under fault conditions and the internal connections of the capacitor bank 5 are, in effect, changed from series to parallel, as explained above, the reactance of the capacitor bank is decreased and, therefore, it no longer neutralizes the inductive reactance of the line 6 to the same extent as under normal conditions. The effective reactance of the line is, therefore, increased, which has the effect of limiting the fault current and preventing it from reaching as high a value as it otherwise would. A further advantage of the invention lies in the fact that the fault current flows through the resistors 8 or 10, which have high losses because of the heavy fault current, and this condition of high losses is very desirable because it further limits the fault current and tends to prevent other undesirable effects such as unstable oscillations in the system. Another advantage of the invention is that the series capacitor bank is restored to its normal reactance value substantially simultaneously with the drop in line current to its normal value, which is an important advantage in the case of series capacitors installed for the primary purpose of increasing the stability of synchronous transmission systems.

It will be understood, of course, that the invention is capable of various other modifications and embodiments. Thus, Fig. 4 shows an embodiment of the invention in which discharge devices are used instead of the variable resistances of Figs. 1 and 3. In this embodiment, successive pairs of capacitors 7 are shunted by spark gap devices 15, which may be of any suitable type, and which are calibrated to break down and commence discharging when the voltage across two series-connected capacitors, which is applied to each spark gap, exceeds a predetermined value. Means are preferably provided for by-passing the discharge devices 15 in order to extinguish the arcs and prevent damage or impairment of the accuracy of calibration by continuing discharges across the spark gaps. For this purpose, a contactor 16 may be used, having a contact 17 connected to complete a by-pass circuit around each spark gap 15, the circuit being preferably completed through a portion 18 of the operating coil 19 of the contactor 16. The coil 19 is connected in series with the gap 15, so that when the gap 15 breaks down and commences discharging, a current flows through the coil 19, causing the contactor 16 to close its contact 17 and by-pass the gap 15. The holding coil 18 holds the contactor 16 closed until the current falls to a predetermined safe value, when it permits the contact 17 to open, interrupting the by-pass circuit. The contactors 16 may be omitted in some cases if self-clearing gaps are used and the expected currents are not too high, but it is usually preferable to utilize these contactors or equivalent devices.

It will be obvious that the operation of this embodiment of the invention is similar to that of Figs. 1 and 3, since the capacitors 7 are normally connected in series because the gaps 15 are non-conducting under normal voltage conditions. When the voltage rises as a result of fault current in the line 6, the gaps 15 break down and connect the capacitors in parallel to reduce the reactance of the capacitor bank in the same manner as previously described. The contactors 16 by-pass the gaps to extinguish the arcs, and maintain the parallel connection of the capacitors 7 until the current has fallen to a safe value, when they interrupt the paralleling connections and restore the series connection of the capacitors 7.

It should now be apparent that a series capacitor assembly has been provided which is very advantageous because of its simplicity and low cost, and because of its inherently reliable operation in reducing the voltage applied to the capacitors under fault conditions. It is to be understood that although certain specific embodiments of the invention have been shown and described for the purpose of illustration, the invention is not limited to these particular embodiments, but in its broadest aspect it includes all equivalent embodiments and modifications which come within the scope of the appended claims.

I claim as my invention:

1. A series capacitor assembly for an alternating-current line comprising a plurality of capacitors, means for connecting said capacitors together in a capacitor bank, means for connecting the capacitor bank in series in a conductor of said alternating-current line, and means responsive to excess voltage across said capacitors for reducing the resultant reactance of the capacitor bank to reduce the voltage across the capacitors.

2. A series capacitor assembly for an alternating-current line comprising a plurality of capacitors, means for connecting said capacitors together in series in a capacitor bank, means for connecting the capacitor bank in series in a conductor of said alternating-current line, and means responsive to excess voltage across the capacitors for providing paralleling connections for the capacitors, to, in effect, change the connections between capacitors from series to parallel, whereby the voltage across the capacitors is reduced.

3. A series capacitor assembly for an alternating-current line comprising a plurality of capacitors, means for connecting said capacitors together in series in a capacitor bank, means for connecting the capacitor bank in series in a conductor of said alternating-current line, and means connected across successive pairs of capacitors for limiting the voltage across said capacitors to a safe value under excess voltage conditions.

4. A series capacitor assembly for an alternating-current line comprising a plurality of capacitors, means for connecting said capacitors together in series in a capacitor bank, means for connecting the capacitor bank in series in a conductor of said alternating-current line, and means connected across successive pairs of capacitors for effecting a parallel connection of the capacitors, said last-mentioned means being substantially non-conducting under normal voltage conditions and being relatively highly conducting under excess voltage conditions.

5. A series capacitor assembly for an alternating-current line comprising a plurality of capacitors, means for connecting said capacitors together in series in a capacitor bank, means for connecting the capacitor bank in series in a conductor of said alternating current line, and voltage-responsive resistance means connected across successive pairs of capacitors for effecting a parallel connection of the capacitors, said resistance means having such high resistance under normal voltage conditions as to be substantially non-conducting and having relatively very low resistance under excess voltage conditions.

6. A series capacitor assembly for an alternating-current line comprising a plurality of capacitors, means for connecting said capacitors together in series in a capacitor bank, means for connecting the capacitor bank in series in a conductor of said alternating-current line, and non-linear resistors connected across successive pairs of capacitors for effecting a parallel connection of the capacitors, said resistors having such high resistance as to be substantially non-conducting under normal voltage conditions and being adapted to decrease their resistance under increasing voltage so as to have relatively very low resistance when the voltage across the capacitors exceeds a predetermined value.

7. A series capacitor assembly for an alternating-current line comprising a plurality of capacitors, means for connecting said capacitors together in series in a capacitor bank, means for connecting the capacitor bank in series in a conductor of said alternating-current line, and non-linear resistors connected across successive pairs of capacitors for effecting connections for paralleling the capacitors, said resistors having such high resistance as to be substantially non-conducting under normal voltage conditions and having relatively very low resistance when the voltage across them increases to abnormally high values.

8. A series capacitor assembly for an alternating-current line comprising a plurality of capacitors, means for connecting said capacitors together in series in a capacitor bank, means for connecting the capacitor bank in series in a conductor of said alternating-current line, and voltage-responsive variable resistance means connected across successive pairs of capacitors for effecting a parallel connection of the capacitors, said variable resistance means having very high resistance under normal voltage conditions and being adapted to decrease their resistance in response to increasing voltage across said capacitors.

9. A series capacitor assembly for an alternating-current line comprising a plurality of capacitors, means for connecting said capacitors together in series in a capacitor bank, means for connecting the capacitor bank in series in said alternating-current line, variable resistance means connected across successive pairs of capacitors for effecting a parallel connection of the capacitors, said variable resistance means having very high resistance under normal voltage conditions, and means responsive to the voltage across said capacitors for decreasing the resistance of the variable resistance means in response to increase in said voltage above a predetermined normal value.

10. A series capacitor assembly for an alternating-current line comprising a plurality of capacitors, means for connecting said capacitors together in series in a capacitor bank, means for connecting the capacitor bank in series in said alternating-current line, and electric discharge devices connected across successive pairs of capacitors for effecting a parallel connection of said capacitors, said discharge devices being normally non-conducting and being adapted to become conducting and complete said parallel connection of the capacitors in response to rise in voltage across the capacitors above a predetermined value.

11. A series capacitor assembly for an alternating-current line comprising a plurality of capacitors, means for connecting said capacitors together in series in a capacitor bank, means for connecting the capacitor bank in series in said alternating-current line, electric discharge devices connected across successive pairs of capacitors for effecting a parallel connection of said capacitors, said discharge devices being normally non-conducting and being adapted to become conducting and complete said parallel connection of the capacitors in response to rise in voltage across the capacitors above a predetermined value, and means for establishing by-pass circuits around said discharge devices in response to current flow through them and for interrupting the by-pass circuits when the current falls to a predetermined value.

RALPH E. MARBURY.

REFERENCES CITED

The following references are of record in the file of this patent:

UNITED STATES PATENTS

| Number | Name | Date |
|---|---|---|
| 1,843,921 | Gay | Feb. 9, 1932 |
| 2,202,715 | Partington | May 28, 1940 |
| 2,202,716 | Partington | May 28, 1940 |